United States Patent
Matsumoto et al.

[11] Patent Number: 4,807,113
[45] Date of Patent: Feb. 21, 1989

[54] MICROPROGRAMMED CONTROL DATA PROCESSING APPARATUS IN WHICH OPERAND SOURCE AND/OR OPERAND DESTINATION IS DETERMINED INDEPENDENT OF MICROPROGRAM CONTROL

[75] Inventors: Hidekazu Matsumoto, Hitachi; Tadaaki Bandoh, Ibaraki; Ryosei Hiraoka, Hitachi; Takayuki Morioka, Hitachi; Yoshihiro Miyazaki, Hitachi, all of Japan

[73] Assignee: Hitachi, Ltd., Tokyo, Japan

[21] Appl. No.: 930,532

[22] Filed: Nov. 14, 1986

Related U.S. Application Data

[63] Continuation of Ser. No. 469,803, Feb. 25, 1983, abandoned.

[30] Foreign Application Priority Data

Feb. 26, 1982 [JP] Japan ................................. 57-28808

[51] Int. Cl.[4] ........................... G06F 9/42; G06F 9/34; G06F 9/36
[52] U.S. Cl. ................................................. 364/200
[58] Field of Search ... 364/200 MS File, 900 MS File

[56] References Cited

U.S. PATENT DOCUMENTS

| 3,976,977 | 8/1976 | Porter et al. | 364/200 |
| 4,110,822 | 8/1978 | Porter et al. | 364/200 |
| 4,236,206 | 11/1980 | Strech et al. | 364/200 |
| 4,454,578 | 6/1984 | Matsumoto et al. | 364/200 |
| 4,530,050 | 7/1985 | Funkimaga et al. | 364/200 |

FOREIGN PATENT DOCUMENTS 57-756 1/1982 Japan .

OTHER PUBLICATIONS

"VAX 11 Architecture Handbook", Digital Equipment Corp., 1979, pp. ii-vii, Chapt. 5 (78-118).
"Pipeline Architecture", Ramamoorthy and Li, Computing Surveys, vol. 9, No. 1, 3/77.

*Primary Examiner*—Gary V. Harkcom
*Assistant Examiner*—Christopher H. Lynt
*Attorney, Agent, or Firm*—Antonelli, Terry & Wands

[57] ABSTRACT

A microprogram controlled data processing apparatus executes multi-operand instructions in which one or more operand specifiers are provided for specifying the addressing for each operand independently from the operation code of the instruction. An instruction execution unit receives a top address of a microprogram from a decoding unit, a ready status signal and a signal from the decoding unit indicating whether a destination of an operand is in a general purpose register or in a memory unit, and writes an operand into a destination address of a register on the memory unit under control of a microprogram. Because the destination of the operand is indicated by the instruction decoding unit, it is not necessary to determine this information by microinstruction execution, with the result that execution of the instruction can be performed at high speed.

13 Claims, 5 Drawing Sheets

FIG. 1

INSTRUCTION FORMAT

MICROPROGRAMMED CONTROL DATA PROCESSING APPARATUS IN WHICH OPERAND SOURCE AND/OR OPERAND DESTINATION IS DETERMINED INDEPENDENT OF MICROPROGRAM CONTROL

CROSS REFERENCE TO RELATED APPLICATION

This application is a continuation of U.S. application Ser. No. 469,803, filed Feb. 25, 1983, and now abandoned.

BACKGROUND OF THE INVENTION

The present invention relates to a microprogram controlled data processing apparatus, and more particularly to a microprogram controlled data processing apparatus for executing instructions which have characteristics of multiple operands and orthogonality, and in which an operand specifier for specifying an address of an operand is given independently from an operation code (OP code) for indicating the operation to be performed with respect to the specified operands Such an instruction format is known from, for example, the "VAX 11 Architecture Handbook", copyright 1979, by Digital Equipment Corporation or U.S. Pat. No. 4,236,206 issued Nov. 25, 1980.

Since the address of the operand is specified independently from the OP code which indicates the operation to be performed, information indicating whether an operand is in a memory unit (hereunder referred to as a "memory") or in a general purpose register (hereunder referred to as a "register") is not given by the OP code, but is given by an operand specifier of the instruction.

In general, a top address of a microprogram stored in microprogram memory for executing an instruction is generated on the basis of an OP code, but in such an instruction format the location of the operand cannot be identified by merely decoding the OP code.

In a prior art microprogram controlled data processing apparatus, it is necessary to include the microinstructions in a microprogram in order to determine whether an operand is in memory or in a register. As a result, for a MOVE instruction, for example, which has two operand specifiers, the microprogram saves, or stores the first operand in a work register in the first step, determines whether the destination of the operand is in the memory or in the register in the second step, and carries out the required write operations in the third step. Thus, the prior art apparatus needs a step for determining the location of the destination of the operand in the course of the microprogram execution and hence fast execution of the instruction is not achieved.

SUMMARY OF THE INVENTION

It is an object of the present invention to provide a microprogram controlled data processing apparatus which executes multiple-operand and orthogonal instructions at a high speed.

It is another object of the present invention to provide a microprogram controlled data processing apparatus having a simplified interface between operands and microprograms.

In accordance with one feature of the present invention, the operand memory access unit sends a signal indicating a ready status of a source operand and a signal indicating a ready status of a destination address of an operand to the instruction execution unit.

In accordance with another feature of the present invention, when a microprogram has a predetermined bit pattern, the instruction execution unit instructs writing of result data to a destination of an operand so that the writing to a location specified by an operand specifier is attained by a single microinstruction independently of the location of the destination operand.

Even with any address of a source operand, the source operand can be handled by only a microinstruction for the execution unit.

BRIEF DESCRIPTION OF THE DRAWINGS

The other objects and features and advantages of the present invention will be apparent from the appended claims and the detailed description of the preferred embodiments taken in conjunction with the accompanying drawings, in which:

DESCRIPTION OF THE PREFERRED EMBODIMENT

Figure 1:
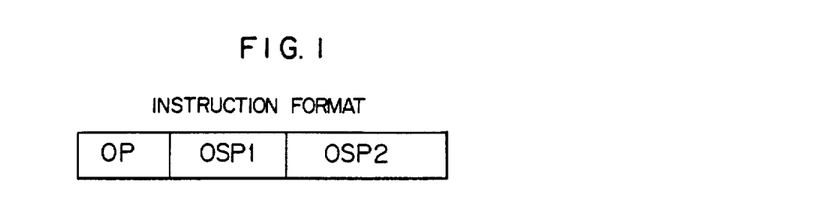
FIG. 1 shows an example of an instruction format handled in the present invention.
Figure 2:
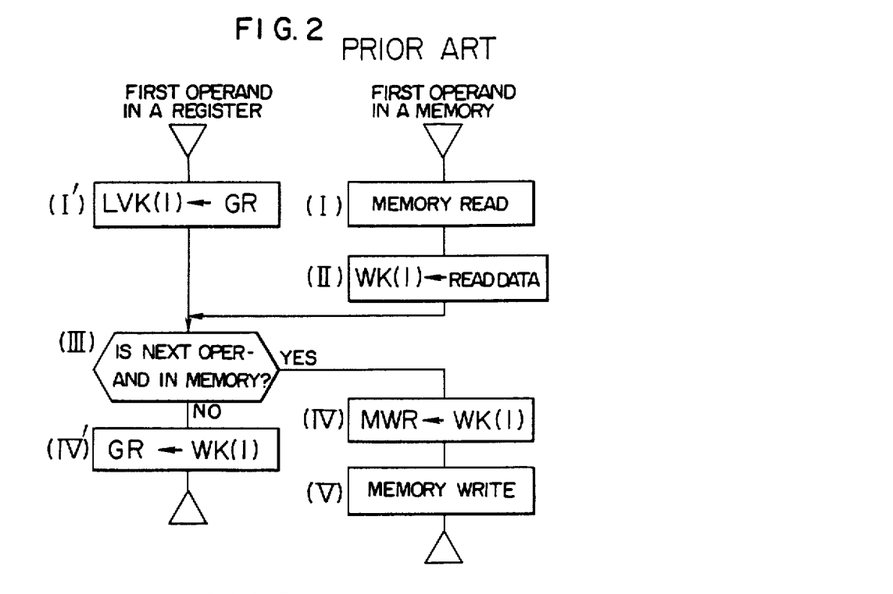
FIG. 2 shows the microprogram flow for a MOVE instruction as executed in a prior art microprogram controlled data processing apparatus.
Figure 3:
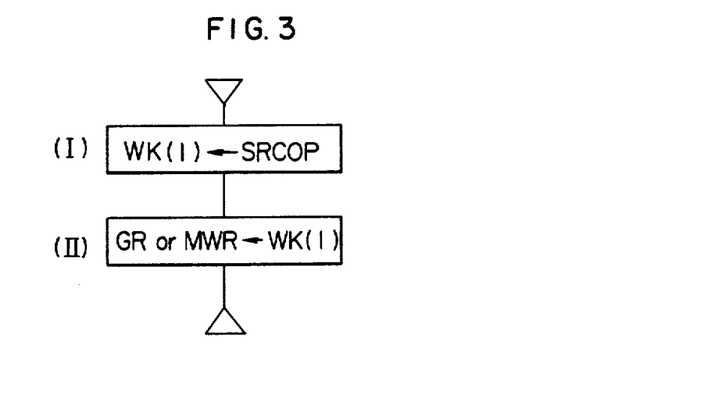
FIG. 3 shows the microprogram flow in accordance with the present invention.

Referring to FIGS. 1 to 3, a characteristic of the present invention is first explained. FIG. 1 shows an example of the instruction format of an instruction as employed in the present invention. It shows a two-operand "MOVE" instruction having two operand specifiers OSP1 and OSP2. The instruction includes an OP code (OP) and two operand specifiers (OSP1 and OSP2).

Such instructions are well known as described above. For a MOVE instruction, the location of an operand (source) is specified by the operand specifier OSP1 and the location to which that operand is to be moved (destination) is specified by the operand specifier OSP2. In order to facilitate the understanding of the microprogram flow for the MOVE instruction in the instruction execution unit of the present invention, an example of the microprogram flow in a prior art apparatus is shown in FIG. 2.

A conventional method has usually determined the location of an operand by a microprogram. However, the method required to determine respective locations of two operands, including a source operand and a destination operand, in execution of a MOVE instruction, for example, results in degrading the performances. To eliminate the drawback, another method has been employed of specifying the top address of the microprogram depending on a different location of the source program which is the first operand.

The microprograms in the steps (I) and (II) of FIG. 2 are for the case where the first operand is stored in a memory, and the step (I') of FIG. 2 shows the case where the first operand is provided by a general purpose register. The location to which the operand is to be moved (destination) is checked, that is to see whether that location is in the register or in the memory in the step (III). If the check operation in the step (III) indicates that the destination of the operand is in the register, the content of the work register WK (1) is loaded into a general purpose register (GR) (the step IV') and if the check operation in the step (III) indicates that the destination of the operand is in the memory, the content of the work register WK (1) is loaded into a memory write register (MWR) (the step IV) and then stored in the memory (the step V).

A microprogram flow in accordance with the present invention is shown in FIG. 3, in which the microprogram for the MOVE instruction is reduced to two steps. A characteristic feature of the present invention resides in the fact that the microprogram does not care about the locations of destination operands.

Figure 4:
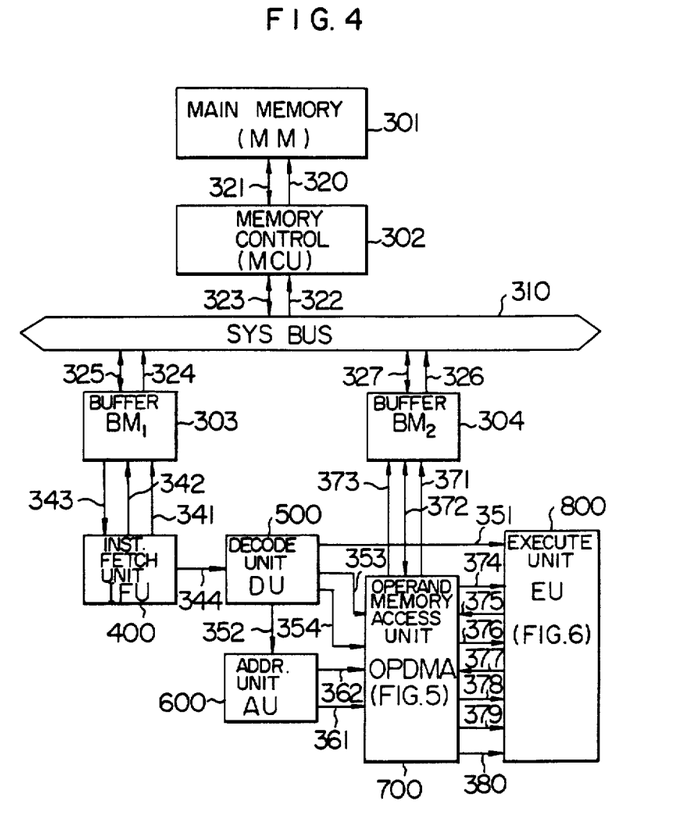
FIG. 4 shows a block diagram of an overall configuration of a microprogram controlled data processing apparatus in accordance with the present invention.

FIG. 4 shows a block diagram of an overall configuration of one embodiment of the microprogram controlled data processing apparatus of the present invention. The data processing apparatus shown in FIG. 4 comprises a main memory (MM) 301, a memory control unit (MCU) 302, high-speed buffer memories (BM1 and BM2) 303 and 304, a system bus (SYS BUS) 310, an instruction fetch unit (IFU) 400, an instruction decode unit (DU) 500, an address calculation unit (AU) 600, an operand memory access unit (OPDMA) 700 and an execution unit (EU) 800.

The MM 301, which is connected to the MCU 302, stores the instructions and the operands (hereinafter referred to as "data").

The MCU 302 sends an address to the MM 301 through a memory address bus 320 and sends or receives the data through a memory data bus 321.

The SYS BUS 310 connects the BM1 303 and the BM2 304 to MCU 302 and it comprises an address bus and a data bus although they are not shown individually in the drawing.

The BM1 303 sends an address to the SYS BUS 310 through a signal line 324 and sends or receives the data through a signal line 325.

The BM1 304 sends an address to the SYS BUS 310 through a signal line 326 and sends or receives the data througha signal line 327.

The MCU 302 and the SYS BUS 310 are connected through signal lines 322 and 323 which are connected to the address bus and the data bus, respectively, of the SYS BUS 310.

While only the BM1 303 and the BM2 304 are shown to be connected to the SYS BUS 310, many processors are connected to the SYS BUS 310 in a multi-processor system to share the MM 301.

The instruction fetch unit (IFU) 400 through the execution unit (EU) 800 are a principal portion of the microprogram controlled data processing apparatus.

The IFU 400 sends an address to the BM1 303 through a signal line 341 and sends an access valid signal to the BM1 303 through a signal line 342 to fetch instructions through a signal line 343 and stores the instructions in an instruction buffer, not shown. Usually, the instruction is fetched in advance of the execution of the instruction.

The instruction decode unit (DU) 500 receives the instruction fetched by the IFU 400 through a signal line 344 and decodes the OP code thereof to generate a top address of a microprogram and transfers it to the execution unit (EU) 800 through a signal line 351.

The DU 500 also sequentially decodes operand specifiers and transfers address calculation information to the address calculation uit (AU) 600 through a signal line 352, and transfers a control signal for preparing an operand to the operand memory access unit (OPDMA) 700 through a signal line 353 and a register address to the OPDMA 700 through signal line 354, if the destination of the operand is in the register.

The address calculation unit (AU) 600 calculates the address and transfers the calculated operand address and an address ready signal to the OPDMA 700 through signal lines 361 and 362, respectively. The OPDMA 700 receives the control signal through the signal line 353 and the address through the signal line 361 to access the memory.

The execution unit 800 receives the top address of the microprogram through the signal line 351 to execute the instruction.

The characteristic feature of the present embodiment resides in the OPDMA 700 and the EU 800. These units are explained in further detail with reference to FIGS. 5 to 7. The IFU 400, the DU 500 and the AU 600 are explained in detail in the copending U.S. application Ser. No. 265,168 filed on May 19, 1981, now U.S. Pat. No. 4,454,578, issued June 12, 1984, entitled "Data Processing Unit with Pipelined Operands" assigned to the present assignee.

Figure 5:
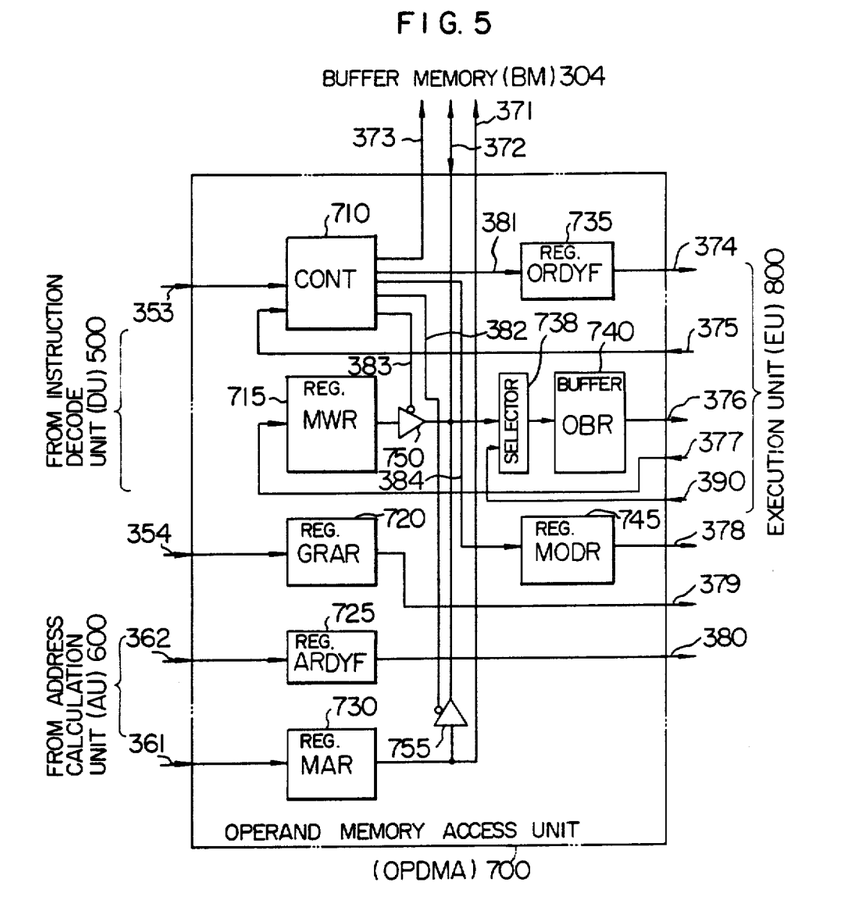
FIGS. 5 and 6 show detailed block diagrams of characteristic portions of FIG. 4.

FIG. 5 shows a block diagram of the OPDMA 700. The OPDMA 700 comprises a memory address register (MAR) 730, an address ready flag (ARDYF) 725, a general purpose register address register (GRAR) 720 for holding an address of a register contained in the operand specifier, a memory write register (MWR) 715 for holding write data, a memory access controller (CONT) 710, a memory operand register (MODR) 745 for indicating whether the operand is in the memory or in the register, an operand buffer register (OBR) 740 for holding a source operand, a flag (ORDYF) 735 for indicating an operand ready status to the EU 800, and drivers 750 and 755. A selector 738 is connected to the input of the OBR 740 to selectively receive data from BM1 304 or GR 820 through line 372 and line 390. While several other units are also included, they are not shown and described because they are not necessary to an understanding of the present embodiment.

The operations of the OPDMA 700 when the operand is the source and when the operand is the destination are now explained.

(1) In Case of Source Operand

The address set in the MAR 730 on the basis of the first operand specifier is transferred to the BM2 304 through the signal line 371, and the CONT 710 sends the top of memory read signal to the BM2 304 through the signal line 373. The data read from the BM2 305 is stored in the OBR 740 through the data bus 372. When the operand is ready, the CONT 710 sets the ORDYF 735 through the signal line 381 to indicate the ready status of the operand to the EU 800 through the signal line 374. During the memory read accessing, the drivers 750 and 755 are deactivated by the signal lines 382 and 383 to prevent a data conflict on the data bus 372. When the operand is supplied in a literal mode or a register mode, the memory access is not necessary.

Since in the literal mode the operand itself is set in the MAR 730, the operand in the MAR 730 is stored in the OBR 740 by activating the driver 755 by the signal line 382. In this manner, the EU 800 can receive the operand from the OBR 740 irrespective of the location of the operand.

(2) In Case of Destination Operand (2-1) When the operand is to be stored in the memory:

The operand address indicated by the second operand specifier is placed in the MAR 730 and the ARDYF 725 is set to indicate the ready status of the address to the EU 800 through the signal line 380. The MODR 745 is now set to "0" by the CONT 710 in response to a signal on line 353 from the DU 500 to indicate to the EU 800 through the signal line 378 that the destination is in the memory. The EU 800 receives the signals from the signal lines 380 and 378 and stores the write data (operand) in the MWR 715 through the signal line 377 and indicates the start of the memory write operation to the CONT 710 through the signal line 375. The CONT 710 receives the signal from the signal line 375 and issues a memory write signal to the BM2 304 through the signal line 373, activates the driver 750 through the signal line 383 and transfers the write data of the MWR 715 to the BM2 304 through the data bus 372. In this manner, the memory write operation is carried out.

(2-2) When the operand is in the register:

The register address is stored in the GRAR 720, and the MODR 745 is set to "1" be CONT 710 via line 384 in response to a signal on line 353 from DU 500 to indicate the presence of the destination of the operand in the register to the EU 800 through the signal line 378. The EU 800 now receives the output of the GRAR 720 as the address through the signal line 379 and writes the write data at the corresponding address of the general purpose register. Since the memory write signal is now not present on the signal line 375, the memory write access is not carried out.

The operand specified by the operand specifier may include a modifier which has a dual function of the source and the destination. It is previously decomposed into the source operand and the destination operand and they are transferred to the OPDMA 700. Accordingly, no new operation mode is necessary.

Figure 6:
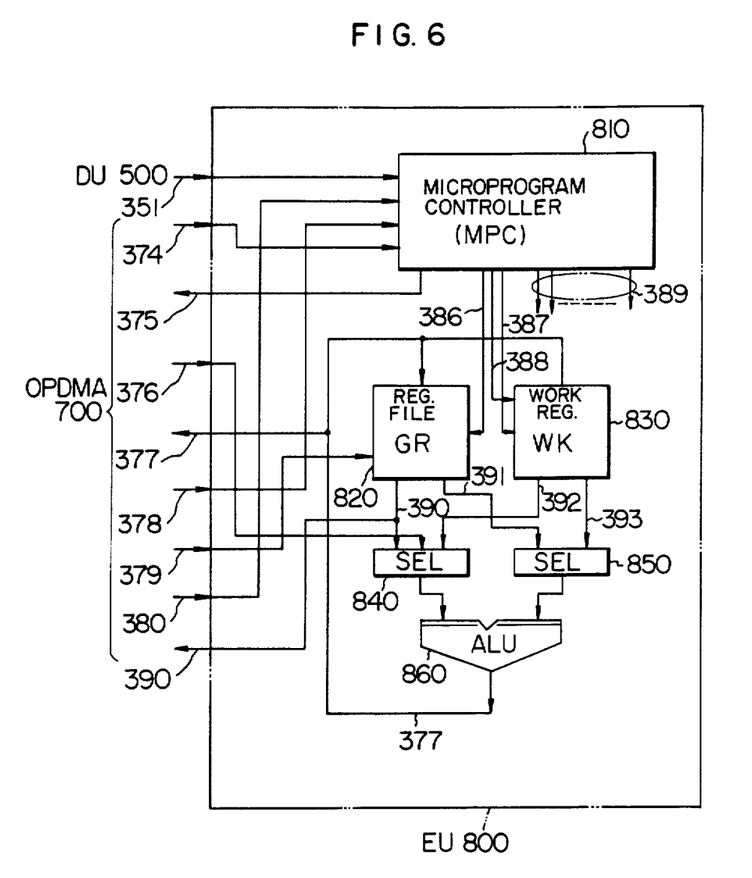

FIG. 6 shows a detailed block diagram of the EU 800. The EU 800 comprises a microprogram controller (MPC) 810, a general purpose register file (GR) 820, a work register file (WK) 830, selectors (SEL) 840 and 850, an arithmetic logic unit (EALU) 860, and many other units, not shown. Lines 390 and 391 provide data read from registers in GR 820 and lines 392 and 393 provide data read from registers in WK 830.

Figure 7:
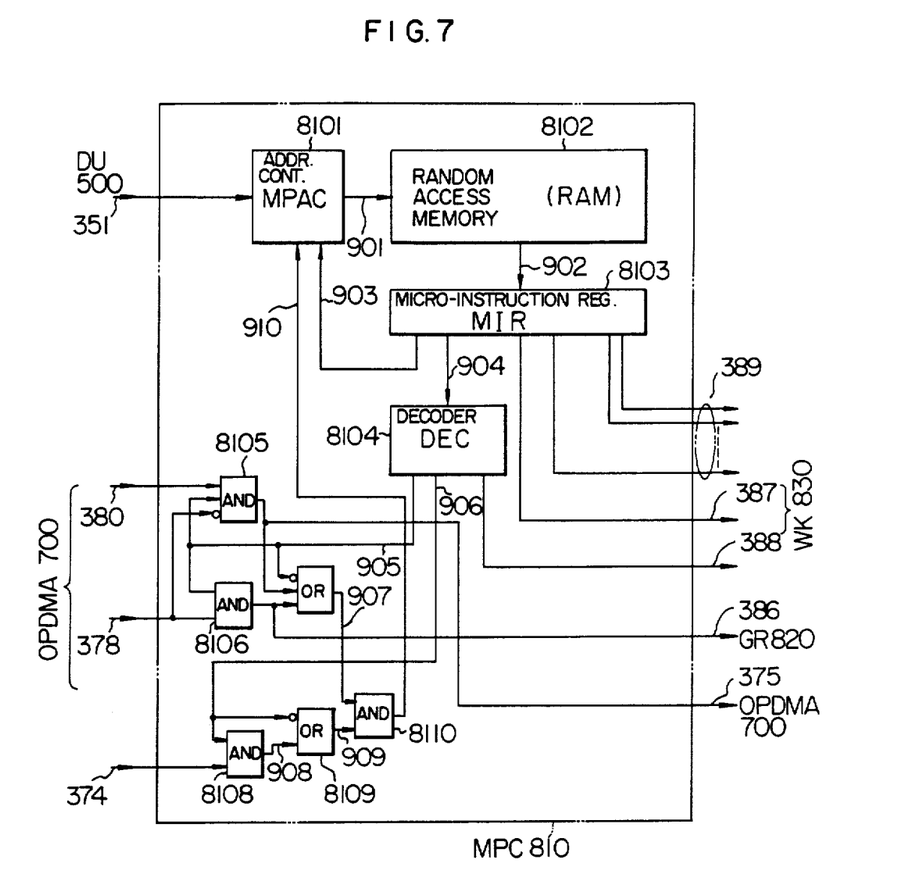
FIG. 7 shows a further detailed block diagram of a portion of FIG. 6.

Since the microprogram controller (MPC) 810 of the EU 800 is particularly pertinent to the present invention, the configuration of the MPC 810 is shown in further detail in FIG. 7. The MPC 810 comprises a random access memory (RAM) 8102 for storing the microprogram, a microinstruction register (MIR) 8103, a microprogram address controller (MPAC) 8101, a decoder (DEC) 8104, AND gates (AND) 8105, 8106, 8108 and 8110, and OR gates (OR) 8107 and 8109. Many other elements are included although they are omitted because they are not necessary to an understanding of the present invention.

The MPAC 8101 provides an address of a microinstruction to be executed next. It sends the address to the RAM 8102 through a signal line 901 to access the RAM 8102, and the microinstruction fetched is set in the MIR 8103 through a signal line 902. The operation is controlled by the microinstruction set in the MIR 8103. The address of the microinstruction to be executed next is sent to the MPAC 8101 by the output 903 of the MIR 8103. The output 387 of the MIR 8103 indicates the address of the WK 830. The output 904 of the MIR 8103 provides a signal to control the writing to the register, the memory access and the receipt of the operand, and this signal is decoded by the decoder DEC 8104. The output 905 of the DEC 8104 is "1" when writing to the destination operand, the output 906 is "1" when the source operand is to be read into the EU 800, and the output 388 provides a permission for writing into the WK 830.

When the output 905 is "1", that is, when the writing to the destination operand, if the output 378 of the MODR 745 is "1", the output 386 of the AND gate 8106 which provides the permission for writing into the GR 820 is "1" and the output 377 of the EALU 860 is written into the GR 820. If the output 378 of the MODR 745 is "0" and the output 380 of the ARDYF 725 is "1", the control signal 375 which indicates the start of memory write access is produced.

When the output 906 is "1", that is, when the microinstruction to receive the source operand is executed, if the signal line 374 which indicates the ready status of the operand is "0", the signal lines 908, 909 and 910 are "0". The signal line 910 provides a grant condition of a clock signal for controlling the execution of the microinstruction. When it is "0", the execution of the microinstruction in that machine cycle is suppressed. When the output 905 is "1", the signal line 374 is "0" and the signal line 378 is "0", that is, when the memory contains the destination operand and the microinstruction attempts the writing to the destination but the address is not ready, the output 910 of the AND gate 8110 is again "0" and the execution of the microinstruction is suppressed.

As shown in FIG. 3, in the microprogram flow for the MOVE instruction in the EU 800, the first operand is received from the OPDMA 700 and stored in the WK (1) in a first step (I), and the writing of the content of the WK (1) to a location indicated by a second operand specifier is instructed in a second step (II). If "SRCOP" is specified in the first step (I), the output 906 of the DEC 8104 assumes "1" and the microinstruction is executed on the condition of "1" at the output 374 of the ORDYF 735, that is, on the condition of the ready state of the source operand. In the second step (II), if "GR or MWR" is specified as the destination, the output 905 of the DEC 8104 assumes "1" and the writing of the operand to the specified destination is carried out in accordance with the state of the MODR 745.

We claim:

1. A microprogram controlled data processing apparatus for executing multiple-operand instructions in which one or more operand specifiers for specifying the source or destination address of an operand are provided independently from the operation code in these instructions, comprising:

(a) memory means for storing instructions and operands;

(b) instruction fetch means connected to said memory means for prefetching and holding instructions;

(c) decoding means connected to said instruction fetch means for decoding an operation code and all operand specifiers in an instruction fetched by said instruction fetch means;

(d) address calculation means connected to said decoding means for calculating the address of a memory location for an operand based on information received from said decoding means;

(e) register file means for holding data including operands;
(f) operand access means connected to said memory means, said decoding means, said address calculating means and said register file means, and for storing an operand, and including,
  (i) memory fetch means for fetching an operand from said memory means when an operand location signal from said decoding means indicates that the operand is in said memory means;
  (ii) register fetch means for fetching an operand from said register file means when said operand location signal indicates that the operand is in said register file means;
  (iii) source operand selection means connected to said memory fetch means and said register fetch means for selecting outputs of either said memory fetch means or said register fetch means in accordance with said operand location signal;
  (iv) memory write means for storing write data into said memory means when an operand location signal from said decoding means indicates that the operand is to be stored in said memory means; and
  (v) register write means connected to said register file means for storing write data into said register file means when said operand location signal from said decoding means indicates that the operand is to be stored in said register file means;
(g) arithmetic means connected to said operand access means for performing arithmetic and logical operations on operands received from said source operand selection means, said arithmetic means supplying said write data to said memory write means and said register write means; and
(h) microprogram control means connected to said decoding means and said operand access means, for controlling said operand access means, and connected to said arithmetic means for controlling the execution of microprograms stored in said microprogram control means.

2. A microprogram controlled data processing apparatus according to claim 1 wherein
said operand access means further includes means for supplying an indicating signal to said microprogram control means indicating that a source operand is ready; and
said microprogram control means further includes means for supplying a source operand request signal for reading a source operand to said operand access means.

3. A microprogram controlled data processing apparatus according to claim 1 wherein
said memory write means further includes means for supplying an indicating signal to said microprogram control means indicating that the address of an operand is ready.

4. A microprogram controlled data processing apparatus for executing multiple-operand instructions in which one or more operand specifiers for specifying the source or destination address of an operand are provided independently from the operation code in these instructions, comprising:
(a) memory means for storing instructions and operands;
(b) instruction fetch means connected to said memory means for prefetching and holding instructions;
(c) decoding means connected to said instruction fetch means for decoding an operation code and all operand specifiers in an instruction fetched by said instruction fetch means to generate address calculating information, a microprogram address, and an operand location signal which indicates whether an operand is located in said memory means;
(d) address calculation means connected to said decoding means for calculating the address of a memory location for an operand based on said address calculating information received from said decoding means;
(e) execution means for executing instructions by operating on operands supplied thereto, including register file means for holding data including operands; and
(f) operand access means, connected to said memory means, said decoding means, said address calculating means and said register file means, for fetching an operand and storing an operand, and including:
  (i) memory fetch means for fetching an operand from said memory means when said operand location signal from said decoding means indicates that the operand is in said memory means; and
  (ii) register fetch means for fetching an operand from said register file means when said operand location signal indicates that the operand is in said register file means;
  (iii) source operand selection means connected to said memory fetch means and said register fetch means for selecting outputs of either said memory fetch means or said register fetch means in accordance with said operand location signal;
  (iv) memory write means for storing write data into said memory means when said operand location signal from said decoding means indicates that the operand is to be stored in said memory means; and
  (v) register write means connected to said register file means for storing write data into said register file means when said operand location signal from said decoding means indicates that the operand is to be stored in said register file means; wherein
said execution means further includes:
  (i) arithmetic means connected to said operand access means for performing arithmetic and logical operations on operands received from said source operand selection means to provide write data, said arithmetic means supplying said write data to said memory write means and said register write means; and
  (ii) microprogram control means, connected to said decoding means and said operand access means, and including means for storing microprograms, for controlling said operand access means on the basis of said microprograms, and connected to said arithmetic means, for controlling the execution of an instruction according to microprograms selected on the basis of said microprogram address received from said decoding means.

5. A microprogram controlled data processing apparatus according to claim 4 where
said operand access means further includes means for supplying an indicating signal to said microprogram control means indicating that a source operand is ready; and said microprogram control means further includes means for supplying a source operand request signal for reading a source operand to said operand access means.

6. A microprogram controlled data processing apparatus according to claim 4 wherein
said memory write means further includes means for supplying an indicating signal to said microprogram control means indicating that a destination memory address of an operand to be written in said memory means is ready.

7. A microprogram controlled data processing apparatus according to claim 4, wherein
said microprogram control means includes a microprogram decoder for decoding said selected microprograms to detect when an operand is a destination operand; and
said memory write means and said register write means are controlled by logic means responsive to said microprogram decoder for providing a signal enabling writing of write data in accordance with said operand location signal or a destination operand.

8. A microprogram controlled data processing apparatus according to claim 7, wherein said logic means includes first gate means responsive to a signal from said microprogram decoder indicating a destination operand and said operation location signal indicating a register mode for applying a start write signal to said register write means.

9. A microprogram controlled data processing apparatus according to claim 8, wherein said logic means further includes second gate means responsive to a signal from said microprogram decoder indicating a destination operand and said operation location signal indicating a memory mode for applying a start write signal to said memory write means.

10. A microprogram controlled data processing apparatus for executing multiple-operand instructions in which one or more operand specifiers for specifying a source or destination of an operand are provided independently from an operation code for ascertaining an operation in said instructions, comprising:
  (A) memory means for storing instructions and operands;
  (B) instruction fetch means connected to said memory means for prefetching and holding instructions;
  (C) decoding means connected to said instruction fetch means for decoding an operation code and all operand specifiers in an instruction fetched by said instruction fetch means;
  (D) address calculation means connected to said decoding means for calculating an effective address of the operand based on information received from the decoding means;
  (E) operand access means connected to said memory means, said decoding means, said address calculating means for accessing said memory means;
  (F) execution means connected to said decoding means and said operand access means for writing data to a destination operand address under control of a microprogram in accordance with a microprogram start address received from said decoding means, and including register file means for holding data including operands;
  said operand access means including:
    (E1) a memory access controller having means for controlling access to said memory means and means responsive to said decoding means for detecting whether an operand is located in said memory means or said register file means;
    (E2) operand location indicate means responsive to said memory access controller for providing a signal indicating whether an operand specified by an instruction is located in said memory means or said register file means;
    (E3) operand address ready indicate means for indicating that an operand specified by an instruction is ready for application to said execution means; and
    (E4) operand address ready indicate means for indicating that an operand address is ready for use for an operand write sequence;
  said execution means including:
    (F1) operand write control means for controlling an operand write sequence to write an operand into said register file or to control said memory access controller to write the operand into said memory means in accordance with the signal from said operand location indicate means.

11. A microprogram controlled data processing apparatus according to claim 10, wherein said memory access controller is connected to receive a start signal of a memory write access sequence from said execution means, and includes means responsive to said start signal for sending an execute signal for a memory write operation to said memory means.

12. A microprogram controlled data processing apparatus according to claim 11, wherein said operand write control means comprises means for sending a start signal of a memory write access sequence to said memory access controller when a microprogram under execution assumes a predetermined pattern in response to said operand location indicate means indicating that an operand is to be sent to said memory means.

13. A microprogram controlled data processing apparatus according to claim 11, wherein said operand write control means comprises means for sending a start signal of a register file write access to said register file means when a microprogram under execution assumes a predetermined pattern in response to said operand location indicate means indicating that an operand is to be sent to said register file means.

* * * * *